Jan. 1, 1935. C. C. NORRIS 1,986,782
LENS STRAP
Filed Aug. 30, 1933
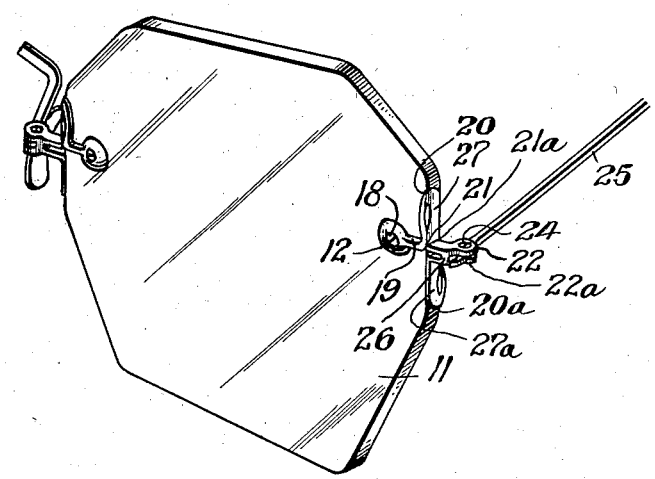
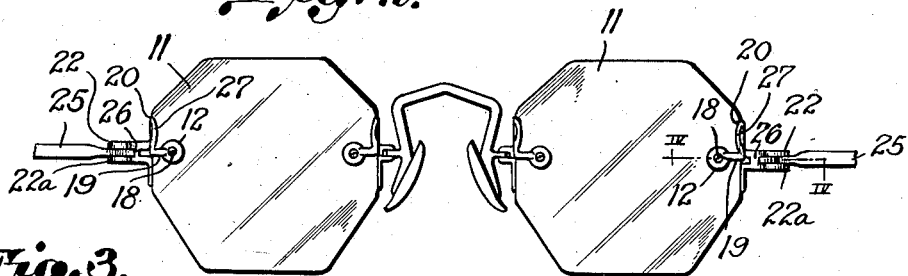
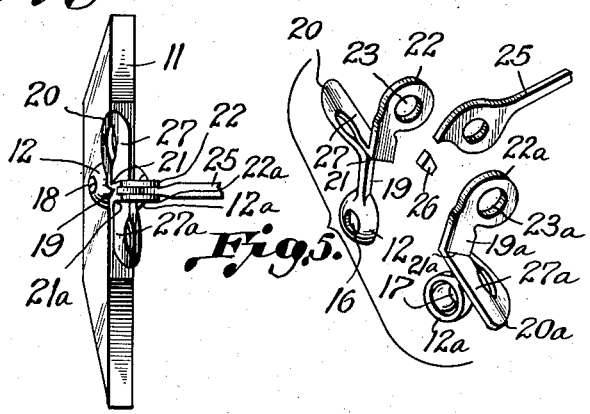
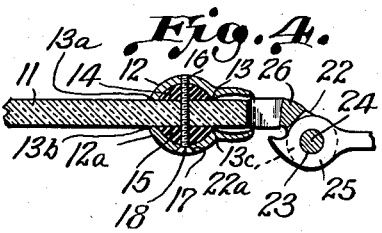
Inventor:
Chester C. Norris
By K. Wilson Cordor
Attorney Patented Jan. 1, 1935

1,986,782

UNITED STATES PATENT OFFICE 1,986,782

LENS STRAP

Chester C. Norris, Atlanta, Ga.

Application August 30, 1933, Serial No. 687,415

13 Claims. (Cl. 88—47)

This invention relates to eyeglasses, and more particularly to a new and improved lens strap intended primarily for use with what is known as rimless glasses.

In recent years the popularity of rimless glasses has accentuated the problem of mounting and assembling the lenses thereof in a secure and operable manner, yet guarding against breakage, the danger of which is at once apparent when considering that the lenses must necessarily be drilled near their delicate edges, for mounting to the nose-bridge and temporal end pieces. As a matter of fact, opticians are constantly called upon to repair and/or replace lenses that have broken for little or no apparent reason, which fact has greatly reduced the desirability of rimless glasses in spite of the many advantageous features connected therewith.

An object of this invention is to provide a lens strap which will hold a lens in proper place and adjustment, yet allow a certain degree of flexibility and permit a certain amount of distortion without breaking the glass with which the strap is associated.

Another object is to provide in conjunction with a device of this character, a cushion mounting for the strap, which mounting lessens the danger of breakage, compensates for changes in temperature and climatic conditions, and prevents the clamping screws from working loose and thus causing the lenses to wobble.

Still another object is to provide a lens strap which affords supplementary support to a lens along its end or outside edge.

Another object is to provide a lens strap which is quickly and easily adjusted to various thicknesses of lenses.

Another object is to provide a lens strap which will not cramp the face of the lens.

Still another object is to provide a lens strap, which, by the elimination of a conventional part, correspondingly reduces the cost of manufacture of the device.

Summarized, the objects of my invention are to provide a lens strap which by virtue of its scientific construction affords an economical and efficient mounting far superior to anything now on the market.

These and other objects made apparent throughout the further progress of this specification are accomplished by means of my special lens strap, a full and complete understanding of which is made possible by reference to the drawing herein, in which:

Fig. 1 is an enlarged view in perspective, showing my device mounted in conjunction with a lens and temple-bar.

Fig. 2 is a front elevational view of a pair of glasses mounted with my lens straps both at the nose-bridge and temple-bars.

Fig. 3 is a side view of the structure illustrated in Fig. 2.

Fig. 4 is a horizontal cross-sectional view of the outer portion of the left lens and associated elements of the device shown in Fig. 2, taken along the line IV—IV thereof looking in the direction of the arrows, the view being turned through an arc of ninety degrees on the drawing.

Fig. 5 is an exploded view in perspective of my device, said view illustrating in detail the construction and structure thereof.

Referring now to the drawing, 11 designates a lens of the type used in eyeglasses, said lens being of any suitable shape and size, and adapted to receive in mounted relationship, cup-shaped clamp elements 12 and 12a, for the purpose of holding the temple-bar in position. The bearing portions 13, 13a, 13b and 13c of cup-shaped elements 12 and 12a are designed so that there will be the least possible contact of the metal thereof with the face of lens 11, it being further contemplated that by thus distributing such contact over a considerable area, the danger of breakage under stress or sudden strain will be greatly reduced, the pressure thus being spread over a greater area and greater resistance to shock being accordingly established. Within the cup-shaped elements and on either side of the lens are placed insulating pads 14 and 15, said pads being of cork, rubber, or any suitable material, and being entirely confined to the interior of said clamps. Elements 12 and 12a are drilled as at 16 and 17 to receive a clamping screw 18, it being intended that when said screw is tightened, insulating pads 14 and 15, which are adapted to lie directly over the holes in the lens through which the screw passes, will help relieve strain on the glass, and in conjunction with the distributed metal bearing surface provided by the rims of the cup-shaped clamp elements, prevent the pressure from breaking the lens. Further, this insulation and distribution of bearing surface is effective in preventing a shock from the outside from breaking the glass, once the mounting is in place, a certain resiliency being provided by such a structure, and nothing being lost in the way of beauty, since the pads are entirely concealed within their containers. This arrangement is substantially like that disclosed in my Patent No. 1,706,314, March 19, 1929, reference to which is suggested for a more detailed description of this structure.

Special attention is now directed to tension arms 19 and 19a of my device, the construction and function of which forms an important part of the instant invention.

Arms 19 and 19a, which are integral with clamps 12 and 12a, extend in a horizontal plane with the center thereof for a distance sufficient to carry them to the edge of the lens with which they are to be associated; and are then carried sharply to the left at a ninety degree angle in the case of a "left" element, and to the right ninety degrees in the case of a "right" element (Fig. 5), the arms being thus carried a suitable distance along the side of the lens, as to points 20 and 20a, and then looped and bent rearwardly and returned along the same plane and in close proximity to the end of the lens, to points 21 and 21a,, said points being in a horizontal plane approximating that from which the initial ninety degree angle was made. Tension arms 19 and 19a are now carried outwardly and parallel to each other to points of termination, 22 and 22a, the ends being drilled as at 23 and 23a to receive a screw 24, and thereby retain a temple-bar 25 in operative position. In order to limit the swing of the temple bar, 19 and 19a may be united as by inserting a small piece of metal, 26, between them, and then by soldering or other means join the parts into an integral unit. The surfaces of the return loops are made comparatively broad and flat, as at 27 and 27a, so that they may seat snugly with the end of the lens, the purpose of this construction being made more clear elsewhere herein.

It is to be noted that the tension arms 19 and 19a are spaced slightly away from the face of lens 11, thereby precluding any cramping of the lens, which factor is very important in view of the tendency of rimless lenses to break at this point. Ample support is provided, however, by the sections of the tension arms which lie along the end of the lens, which sections engage the edge of the lens so as to provide both support and tension for holding the lenses in proper alignment, yet are part of a yielding and flexible structure which will compensate for considerable distortion without injury to the lens.

The structure of the mounting for the nose-bridge is identical with that for the temple-bar, with the exception that the outer ends thereof are not drilled, but instead are soldered or otherwise suitably and firmly joined to the box end of the bridge as shown in Fig. 2. If desired, said ends may be carried outwardly, somewhat before they reach points 21 and 21a such a construction providing greater space between the ends, and a substantial cavity within which the nose-bridge may be anchored.

My improved lens strap may be stamped from sheet metal of suitable thickness, in lefts and rights (Fig. 5), this simple operation forming a combined lens strap and end piece, whereas the conventional lens strap must have a supplementary end piece attached thereto, this requiring another operation in manufacture and entailing additional expense from a stand-point of material and labor. By eliminating this extra part and extra step, my device represents a distinct advance in the art, both from a stand-point of economy and efficiency, this feature being an important one in connection with the instant invention.

Another advantage of my device lies in the ease with which it may be adapted to lenses of varying thicknesses, it being apparent that tension arms 19 and 19a may be quickly spread to accommodate almost any lens, without filing to permit mounting, as is necessary in the case of ordinary lens straps associated with lenses of more than usual thickness.

From the foregoing it is apparent that my improved lens strap represents a unique and superior article of this type. Being insulated at the point where it joins the lens, variations in heat and cold and climatic conditions are compensated for without injury to the lens, as otherwise might occur. In view of the combined action of the insulation and greatly distributed bearing surface, considerable resiliency is provided, which greatly reduces the danger of the lens breaking at this point under shock or strain.

Further, my special tension arms with their spring-like structure and action, provide a still greater compensating feature which permits considerable distortion without injury to the glass. Again, the tension arms do not cramp the lens at critical points, but rather, support the lens at a point where the greatest stress may be applied with minimum danger. The device is easily adjusted; artistic in appearance; and makes possible a real economy in manufacture.

Various modifications in the form and design of tension arms 19 and 19a may be resorted to without departing from the scope of my invention, the essential idea being to provide such arms in conjunction with my cup-shaped mounting so as to secure the advantages in flexibility and resistance to shock set forth herein.

While I have described one form of my invention, I do not intend to limit myself strictly thereby, it being understood that various changes in the form and structure of my device, and particularly in the shape and extent of tension arms 19 and 19a, may be resorted to without departing from the scope of the appended claims, which are to be construed broadly as my contribution to the art warrants.

I claim:

1. In a lens strap, in combination, cup-shaped clamping members and spring tension arms extending therefrom, said tension arms being spaced from the two main surfaces of the lens and extending in a plane parallel thereto to a point near the edge thereof, and then being bent in opposite directions at an angle approximating ninety degrees and carried along the side of the lens in the same plane thereof for a given distance for the purpose of lending greater spring to said arms; said arms then being bent back and returned along the end of said lens to a point approximating the plane of the initial angle and terminated in portions adapted to receive an optical fitting.

2. In a lens strap, in combination, cup-shaped clamping members and spring tension arms extending therefrom and integral therewith, said tension arms being spaced from the two main surfaces of a lens and extending in a plane parallel thereto to a point near the edge thereof, and then being respectively bent in opposite directions at right angles and carried along the side of the lens in the same plane thereof for a stated distance for the purpose of lending greater spring to said arms; said arms then being looped back and returned along the end of said lens to a point approximating the plane of the initial angle, and then bent to form parallel studs extending in said plane, said studs being drilled near their ends to receive a temple bar.

3. In a lens strap, in combination, cup-shaped clamping members and two spring tension arms extending therefrom, said tension arms being spaced from the two main surfaces of a lens and extending in a plane parallel thereto to a point near the edge thereof, and then being respectively bent in opposite directions and carried along the side of the lens in the same plane thereof for a distance sufficient to lend greater spring to said arms; said arms then being looped back and returned along the end of said lens to a point approximating the plane of the initial bendure and then bent to form parallel studs extending in said plane and adapted to receive a nose-bridge.

4. In a lens strap, in combination, cup-shaped clamping members and spring tension arms extending therefrom and integral therewith, said tension arms extending in a plane parallel to a lens with which the strap is associated, to a point near the edge of said lens, and then being bent at an angle and carried along the side of the lens in the same plane thereof for a given distance, for the purpose of lending greater spring to said arms; said arms then being looped back and returned along the end of said lens to a point approximating the plane of the initial angle, and then bent to form parallel studs extending in said plane.

5. In a lens strap, in combination, cup-shaped clamping members and two spring tension arms extending therefrom and integral therewith, said tension arms being spaced from the two main surfaces of a lens and extending in a plane parallel thereto to a point near the edge thereof, and then being respectively bent in opposite directions at an angle and carried along the side of the lens in the same plane thereof for a given distance, for the purpose of lending greater spring to said arms; said arms then being looped back and returned along the end of said lens to a point approximating the plane of the initial angle, said loops being flattened to provide a suitable sliding bearing surface along the end of the lens.

6. In a lens strap, in combination, cup-shaped clamping members, insulating pads entirely within said members, a screw extending through said cup-shaped members and the lens for firmly mounting the strap thereon, and spring-like tension arms permitting a degree of distortion of the strap without breaking the lens, said tension arms being integral with said clamping members and extending in a plane parallel to said lens to a point near the edge thereof, and then being bent in opposite directions at an angle and carried along the side of the lens in the same plane therefor for a distance sufficient to afford greater spring to said arms; said arms then being looped back and returned along the end of said lens and terminated in portions adapted to receive a temple bar.

7. In a lens strap, in combination, cup-shaped clamping members, insulating pads entirely within said members, a screw extending through said cup-shaped members and the lens for firmly mounting the strap thereon, and spring tension arms extending from said clamping members and integral therewith, said tension arms being spaced from the two main surfaces of a lens and extending in a plane parallel thereto to a point near the edge thereof, and then being bent in opposite directions and carried along the side of the lens in the same plane thereof for a given distance for the purpose of lending greater spring to said arms and thereby permit a degree of distortion of the strap without breaking the lens; said arms then being looped back and returned along the end of said lens and terminated in portions adapted to receive a nose-bridge.

8. In a lens strap, in combination, cup-shaped clamping members having the least possible bearing edges for contact with a lens, insulating elements within said cup-shaped members, a screw extending through the cup-shaped members and the lens for firmly mounting the strap thereon, and spring-like tension arms extending from said clamping members and being integral therewith, said tension arms extending into a plane parallel to the lens with which the strap is associated, to a point near the edge thereof, and then bent at right angles and carried along the side of said lens in the same plane thereof for a given distance for the purpose of providing greater spring to said arms; said arms then being looped back and returned along the end of said lens in portions adapted to receive an optical fitting; and means uniting said tension arms near the outside ends thereof.

9. In a lens strap, in combination, clamping members and spring-like tension arms extending therefrom and integral therewith, said tension arms being spaced from the two main surfaces of a lens and extending in a plane parallel thereto to a point near the edge thereof, and then being respectively bent at an angle in opposite directions and carried along the side of the lens in the same plane thereof for a given distance for the purpose of lending greater spring to said arms; said arms then being looped back and returned along the end of said lens to a point approximately the plane of the initial flexure.

10. In a lens strap, in combination, clamping members and spring-like tension arms extending therefrom, said tension arms extending in a plane parallel to the two main surfaces of a lens with which said strap is associated, to a point near the edge of said lens, and then being bent at right angles in opposite directions and carried along the side of the lens in the same plane thereof for a stated distance; said arms then being bent back and returned along the end of said lens to a point approximating the plane of the initial flexure, and terminated in portions adapted to receive an optical fitting.

11. In a lens strap, in combination, clamping members and spring tension arms extending therefrom, said tension arms extending in a plane parallel to the surface of a lens with which said strap is associated, to a point near the edge of the lens, and then being bent in generally opposite directions and carried along the side of said lens in the same plane thereof for a distance calculated to lend greater spring to said arms; said arms then being bent back and returned along the end of said lens to a point approximating the initial flexure, and terminated in portions adapted to receive an optical fitting such as a temple bar.

12. In a lens strap, in combination, clamping members and spring tension arms extending therefrom, said tension arms extending in a plane parallel to the surface of a lens with which said strap is associated, to a point near the edge of said lens, and then being bent respectively in opposite directions and carried along the edge of said lens in the same plane thereof for a distance sufficient to lend greater spring to said arms; said arms then being looped back and returned along the end of said lens and terminated in portions adapted to receive a nose-bridge.

13. In a lens strap, in combination, clamping members and spring tension arms extending therefrom, said tension arms extending in a plane parallel to the surface of a lens with which said strap is associated, to a point near the edge of said lens, and then being bent in opposite direction and carried along the edge of said lens in the same plane thereof for a given distance, and then being looped back and returned along the end of said lens and terminated in portions adapted to receive an optical fitting, said loops being flattened to provide a suitable sliding bearing surface along the end of the lens.

CHESTER C. NORRIS.